US012437699B2

(12) United States Patent
Kim

(10) Patent No.: US 12,437,699 B2
(45) Date of Patent: Oct. 7, 2025

(54) DISPLAY DEVICE INCLUDING A CIRCUIT BOARD

(71) Applicant: SAMSUNG DISPLAY CO., LTD., Yongin-si (KR)

(72) Inventor: Min-Woo Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/617,444

(22) Filed: Mar. 26, 2024

(65) Prior Publication Data

US 2025/0054431 A1 Feb. 13, 2025

(30) Foreign Application Priority Data

Aug. 11, 2023 (KR) ........................ 10-2023-0105835

(51) Int. Cl.
*G09G 3/20* (2006.01)

(52) U.S. Cl.
CPC ... *G09G 3/2092* (2013.01); *G09G 2300/0847* (2013.01); *G09G 2310/0205* (2013.01); *G09G 2370/08* (2013.01); *G09G 2370/14* (2013.01)

(58) Field of Classification Search
CPC ......... G09G 3/2092; G09G 2300/0847; G09G 2300/0246; G09G 2310/0205; G09G 2370/08; G09G 2370/14
USPC .......................................................... 345/204
See application file for complete search history.

(56) References Cited

U.S. PATENT DOCUMENTS

| | | | | |
|---|---|---|---|---|
| 7,646,381 | B2 * | 1/2010 | Komatsu | G06F 13/409 326/38 |
| 2014/0132592 | A1 * | 5/2014 | Liu | H04L 25/0272 375/295 |
| 2015/0255032 | A1 * | 9/2015 | Xu | G09G 3/3688 345/99 |
| 2015/0310824 | A1 * | 10/2015 | Yang | G09G 5/006 345/213 |
| 2018/0074361 | A1 * | 3/2018 | Chung | F21V 33/0052 |
| 2021/0134897 | A1 * | 5/2021 | Choi | G02F 1/13452 |
| 2022/0350562 | A1 * | 11/2022 | Wang | G09G 5/006 |
| 2023/0206821 | A1 * | 6/2023 | Gu | G09G 3/2096 345/213 |
| 2023/0337490 | A1 * | 10/2023 | Jung | H10K 59/131 |
| 2023/0402009 | A1 * | 12/2023 | Kim | G09G 3/3233 |

FOREIGN PATENT DOCUMENTS

| | | | |
|---|---|---|---|
| JP | 2011-10209 | B2 | 1/2011 |
| KR | 10-0635353 | B1 | 12/2004 |
| KR | 10-2008-0037468 | A | 4/2008 |

* cited by examiner

*Primary Examiner* — Tom V Sheng
(74) *Attorney, Agent, or Firm* — F. CHAU & ASSOCIATES, LLC

(57) ABSTRACT

A display panel including pixels and a circuit board electrically connected to the display panel, wherein the circuit board includes: a base film having a first area overlapping at least a portion of a connector and a second area spaced apart from the connector; and a unit signal line disposed on the base film, electrically connected to the connector, and having a first characteristic impedance in the first area and a second characteristic impedance in the second area, the second characteristic impedance being smaller than the first characteristic impedance.

19 Claims, 11 Drawing Sheets

DISPLAY DEVICE INCLUDING A CIRCUIT BOARD

This application claims priority under 35 U.S.C. § 119 to Korean Patent Application No. 10-2023-0105835, filed on Aug. 11, 2023 in the Korean Intellectual Property Office, the content of which is incorporated by reference herein in its entirety.

1. TECHNICAL FIELD

The disclosure relates to a display device. More specifically, the disclosure relates to a display device including a circuit board.

2. DESCRIPTION OF THE RELATED ART

As information technology develops, the importance of a display device as a connection medium between a user and information is being highlighted. For example, the use of display devices such as a liquid crystal display device (LCD), an organic light emitting diode (OLED) display device, a plasma display device (PDP), a quantum dot display device is on the rise.

The display device includes a display panel and a circuit board, where the circuit board is electrically connected to the display panel and provides various signals and voltages for driving the display panel.

SUMMARY

Embodiments provide a display device with high-speed signal transmission performance.

A display device according to an embodiment includes a display panel including pixels and a circuit board electrically connected to the display panel, wherein the circuit board includes: a base film having a first area overlapping at least a portion of a connector and a second area spaced apart from the connector; and a unit signal line disposed on the base film, electrically connected to the connector, and having a first characteristic impedance in the first area and a second characteristic impedance in the second area, the second characteristic impedance being smaller than the first characteristic impedance.

A display device according to an embodiment includes a display panel including pixels and a circuit board electrically connected to the display panel, wherein the circuit board includes: a base film, a first component and a second component disposed on the base film and spaced apart from each other along a first direction, a first signal line disposed on the base film, extending in a second direction intersecting the first direction, wherein the first signal line includes a first part disposed between the first component and the second component and a second signal line disposed on the base film, extending in the second direction, wherein the second signal line includes a second part disposed between the first component and the second component.

BRIEF DESCRIPTION OF THE DRAWINGS

Illustrative embodiments will be more clearly understood from the following detailed description taken in conjunction with the accompanying drawings.

DETAILED DESCRIPTION OF THE EMBODIMENTS

Figure 1:
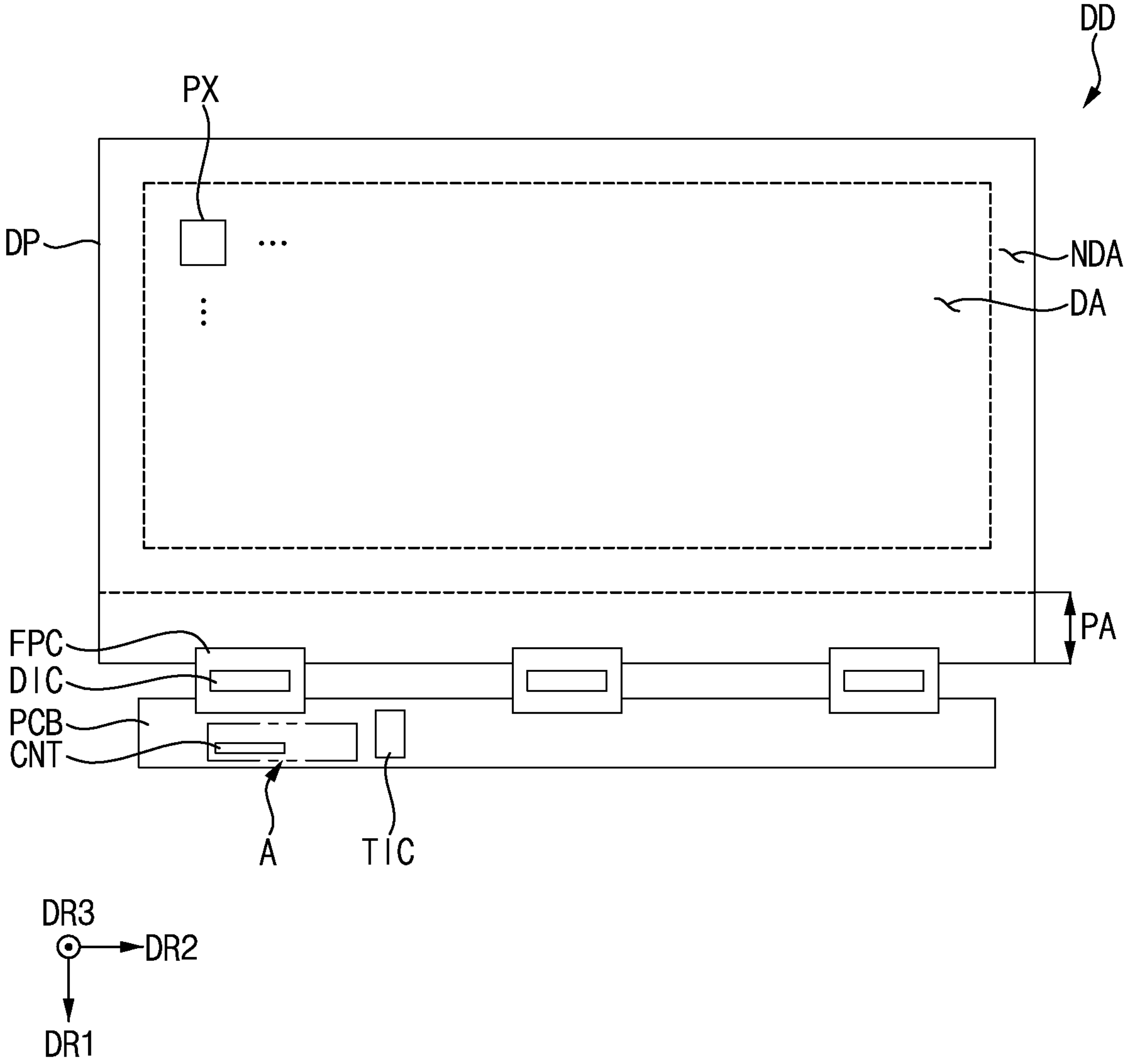
FIG. 1 is a plan view illustrating a display device according to an embodiment.

The invention now will be described more fully hereinafter with reference to the accompanying drawings, in which various embodiments are shown. This invention may, however, be embodied in many different forms, and should not necessarily be construed as limited to the embodiments set forth herein. Rather, these embodiments are provided so that this disclosure will be thorough and complete, and will fully convey the scope of the invention to those skilled in the art. Like reference numerals may refer to like elements throughout the specification and the figure.

In this specification, a plane may be defined by a first direction DR1 and a second direction DR2. A third direction DR3 may be a normal direction to the plane. That is, the third direction DR3 may be perpendicular to both the first direction DR1 and the second direction DR2 and may be in a thickness direction of the display device DD.

FIG. 1 is a plan view illustrating a display device according to an embodiment.

Referring to FIG. 1, a display device DD according to an embodiment may include a display panel DP, flexible circuit films FPC, data drivers DIC, and a circuit board PCB.

The display panel DP may include a display area DA and a peripheral area NDA. The display area DA may be an area that generates light or displays an image by adjusting a transmittance of light provided from an external light source.

A plurality of pixels PX may be arranged in the display area DA. Each of the pixels PX may emit light. As each of the pixels PX emits light, the display area DA may display an image.

The plurality of pixels PX may be arranged in a matrix form along a first direction DR1 and a second direction DR2 intersecting the first direction DR1.

Lines connected to the plurality of pixels PX may be further disposed in the display area DA. For example, the lines may include data signal lines, gate signal lines, power lines, or the like.

The peripheral area NDA may be located proximate to the display area DA. For example, the peripheral area NDA may surround at least a portion of the display area DA. The peripheral area NDA may be an area that does not display images. However, the present invention is not necessarily limited to this, and the image may be displayed in at least part of the peripheral area NDA.

A gate driver for generating a gate signal and/or a light emission driver for generating a light emission control signal may be disposed in the peripheral area NDA. The gate driver and the light emission driver may be formed together during a process of forming the plurality of pixels PX. The gate signal and the light emission control signal may be applied to the plurality of pixels PX.

The peripheral area NDA may include a pad area PA. The pad area PA may be spaced apart from a side of the display area DA in the first direction DR1. The pad area PA may have a rectangular shape extending in the second direction DR2. The length of the pad area PA in the first direction DR1 may be shorter than the length of the display area DA in the first direction DR1. Pad electrodes may be disposed in the pad area PA. The pad electrodes may be electrically connected to the plurality of pixels PX. Additionally, the pad electrodes may be electrically connected to the circuit board PCB.

The flexible circuit films FPC may be disposed on a side of the display panel DP. For example, the flexible circuit films FPC may be spaced apart from the side of the display area DA along the first direction DR1. Specifically, each of the flexible circuit films FPC may overlap a portion of the pad area PA. One end of each of the flexible circuit films FPC may be electrically connected to the pad electrodes disposed in the pad area PA.

Additionally, the other side, opposite to the side facing the display panel DP, of each of the flexible circuit films FPC may be connected to the circuit board PCB. That is, the flexible circuit films FPC may electrically connect the display panel DP and the circuit board PCB. In an embodiment, each of the flexible circuit films FPC may be a flexible film. However, the present invention is not necessarily limited thereto.

In an embodiment, the data drivers DIC may be disposed on the flexible circuit films FPC, respectively. The display device DD may have a chip on film (COF) structure. However, the present invention is not necessarily limited thereto.

The circuit board PCB may be connected to the other end of each of the flexible circuit films FPC. In an embodiment, a timing controller TIC may be disposed on the circuit board PCB. The timing controller TIC may generate image data and control signals based on image signals input from the outside, and the data drivers DIC may convert the image data applied from the timing controller TIC into a data voltage and transmit the data voltage to the plurality of pixels PX.

For example, a signal output from the timing controller TIC may be transmitted to the display panel DP through the flexible circuit films FPC. Specifically, the signal output from the timing controller TIC may be transmitted to the plurality of pixels PX through the pad electrodes of the display panel DP via the flexible circuit films FPC.

Additionally, a connector CNT may be disposed on the circuit board PCB. The connector CNT may include an electrically conductive material. The connector CNT may electrically connect the circuit board PCB and an external device. For example, the external device may be combined with the connector CNT, so that the circuit board PCB and the external device may be electrically connected. The external device may generate a driving signal, a driving voltage, etc. to display an image in the display area DA. The driving signal, the driving voltage, etc. generated from the external device may be transmitted to the plurality of pixels PX through the circuit board PCB, the timing controller TIC, the flexible circuit films FPC, and the data drivers DIC. In an embodiment, the circuit board PCB may be a printed circuit board (PCB).

In FIG. 1, the display device DD is illustrated to include three flexible circuit films and three data drivers, but the number of the flexible circuit films FPC and data drivers DIC is not necessarily limited thereto. Additionally, in FIG. 1, the flexible circuit films FPC and the circuit board PCB are illustrated as being disposed on a bottom side of the display panel DP, but the present invention is not necessarily limited thereto. For example, the flexible circuit films FPC and the circuit board PCB may also be disposed on a top, left, and/or right side of the display panel DP.

Figure 2:
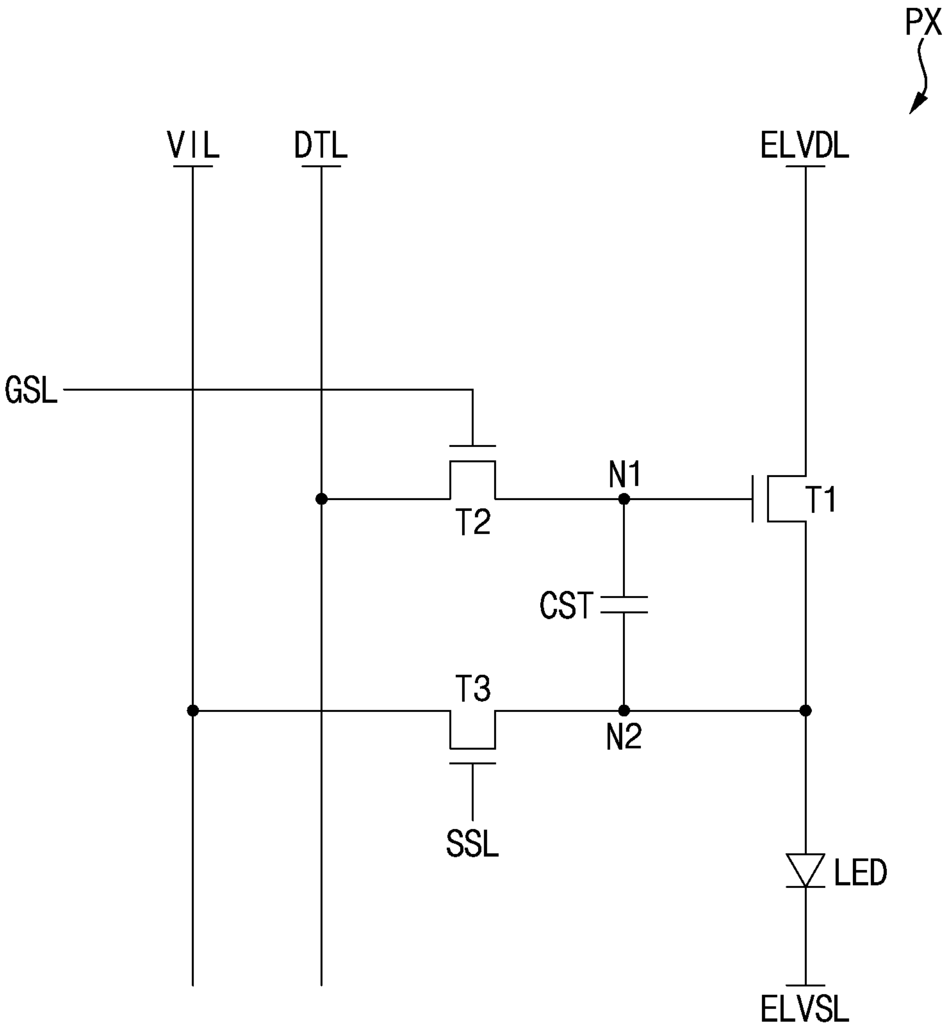
FIG. 2 is a circuit diagram illustrating one of the pixels included in the display device of FIG. 1.

FIG. 2 is a circuit diagram illustrating one of the pixels included in the display device of FIG. 1.

Referring to FIG. 2, each of the plurality of pixels PX included in the display device DD according to an embodiment may include first to third transistors T1, T2, and T3, a storage capacitor CST, and a light emitting diode LED.

The first transistor T1 may include a source electrode, a drain electrode, and a gate electrode. The first transistor T1 may adjust a current flowing from a driving voltage line ELVDL, which supplies the driving voltage to the light-emitting device LED, according to a voltage difference between the gate electrode and the source electrode.

For example, the first transistor T1 may be a driving transistor for driving the light emitting diode LED. The gate electrode of the first transistor T1 may be connected to a first node N1. The source electrode of the first transistor T1 may be connected to the first electrode of the light emitting diode LED. The drain electrode of the first transistor T1 may be connected to the driving voltage line ELVDL to which the driving voltage is applied.

The second transistor T2 may include a source electrode, a drain electrode, and a gate electrode. The second transistor T2 may be turned on by the gate signal of a gate signal line GSL and connect a data signal line DTL to the gate electrode of the first transistor T1. The gate electrode of the second transistor T2 may be connected to the gate signal line GSL. The source electrode of the second transistor T2 may be connected to the first node N1. The drain electrode of the second transistor T2 may be connected to the data signal line DTL.

The third transistor T3 may include a source electrode, a drain electrode, and a gate electrode. The third transistor T3 may be turned on by a sensing signal of the sensing signal line SSL and connect an initialization voltage line VIL to one end of the light emitting diode LED. The gate electrode of the third transistor T3 may be connected to the sensing signal line SSL. The source electrode of the third transistor T3 may be connected to a second node N2. The drain electrode of the third transistor T3 may be connected to the initialization voltage line VIL to which an initialization voltage is applied.

However, the source electrode and drain electrode of each of the first to third transistors T1, T2, and T3 are not necessarily limited thereto, and vice versa. Additionally, each of the first to third transistors T1, T2, and T3 may be formed as a thin film transistor.

The storage capacitor CST may include a first electrode and a second electrode. The first electrode of the storage capacitor CST may be connected to the first node N1. The second electrode of the storage capacitor CST may be connected to the second node N2. The storage capacitor CST may store a difference voltage between a gate voltage and a source voltage of the first transistor T1.

The light emitting diode LED may emit light according to the current supplied through the first transistor T1. The light emitting diode LED may be an organic light emitting diode including a first electrode (e.g., anode electrode), an organic light emitting layer, and a second electrode (e.g., cathode electrode). However, embodiments of the present invention are not necessarily limited thereto, and the light emitting diode LED may be an inorganic light emitting diode including an inorganic light emitting layer, a quantum dot light emitting diode including a quantum dot light emitting layer, or the like. Additionally, the light emitting diode LED may be a micro-LED. The first electrode of the light emitting diode LED may be connected to the source electrode of the first transistor T1, and the second electrode of the light emitting diode LED may be connected to a common voltage line ELVSL to which a common voltage lower than the driving voltage is applied.

In FIG. 2, a case where each of the pixels PX includes three transistors, one storage capacitor, and one light emitting diode LED has been described, but the number of transistors included in each of the pixels PX, the number of storage capacitors included in each of the pixels PX, and the number of light emitting diodes included in each of the pixels PX are not necessarily limited thereto.

Figure 3:
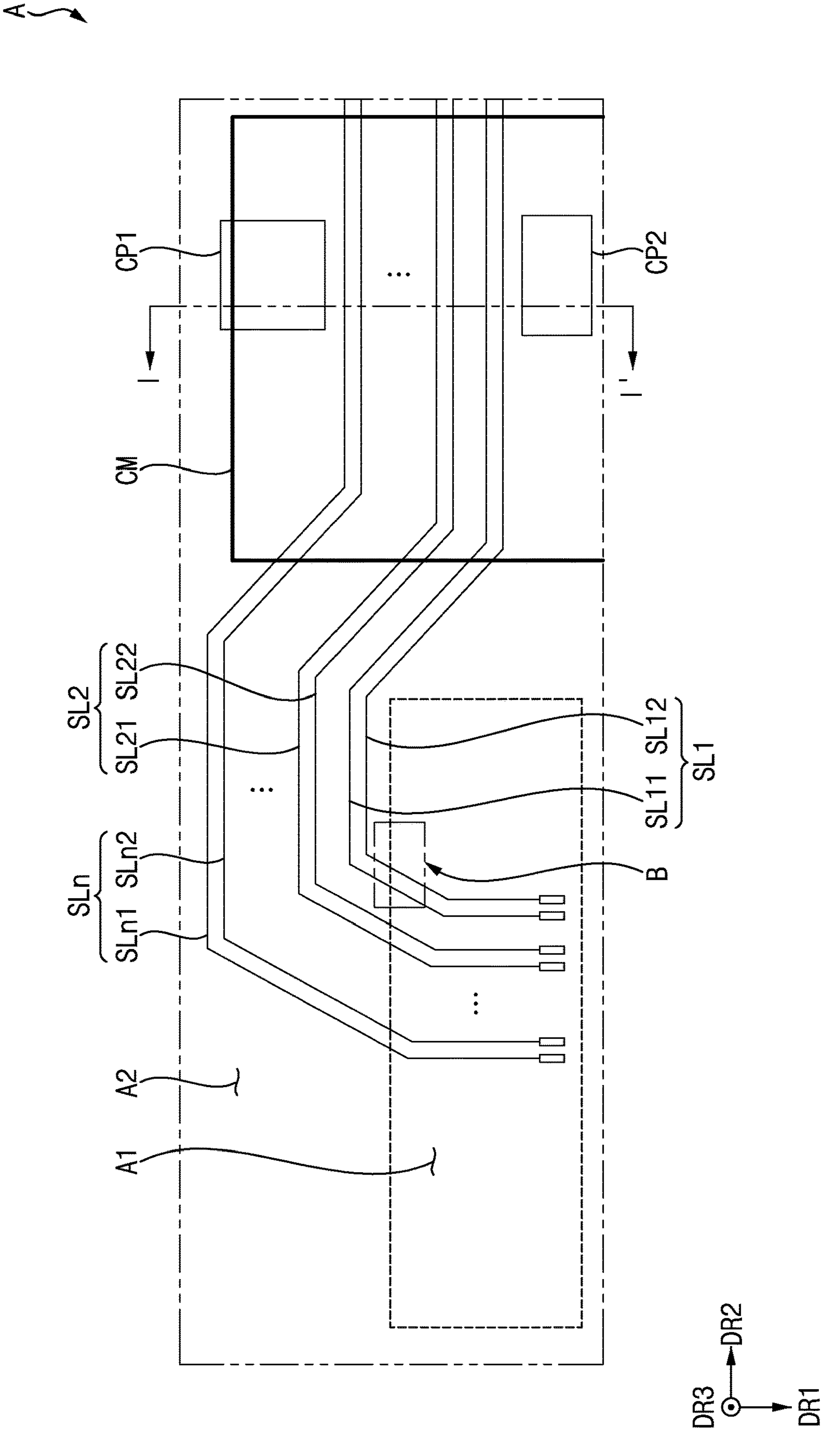
FIG. 3 is an enlarged plan view of area A of FIG. 1 according to an embodiment.
Figure 4:
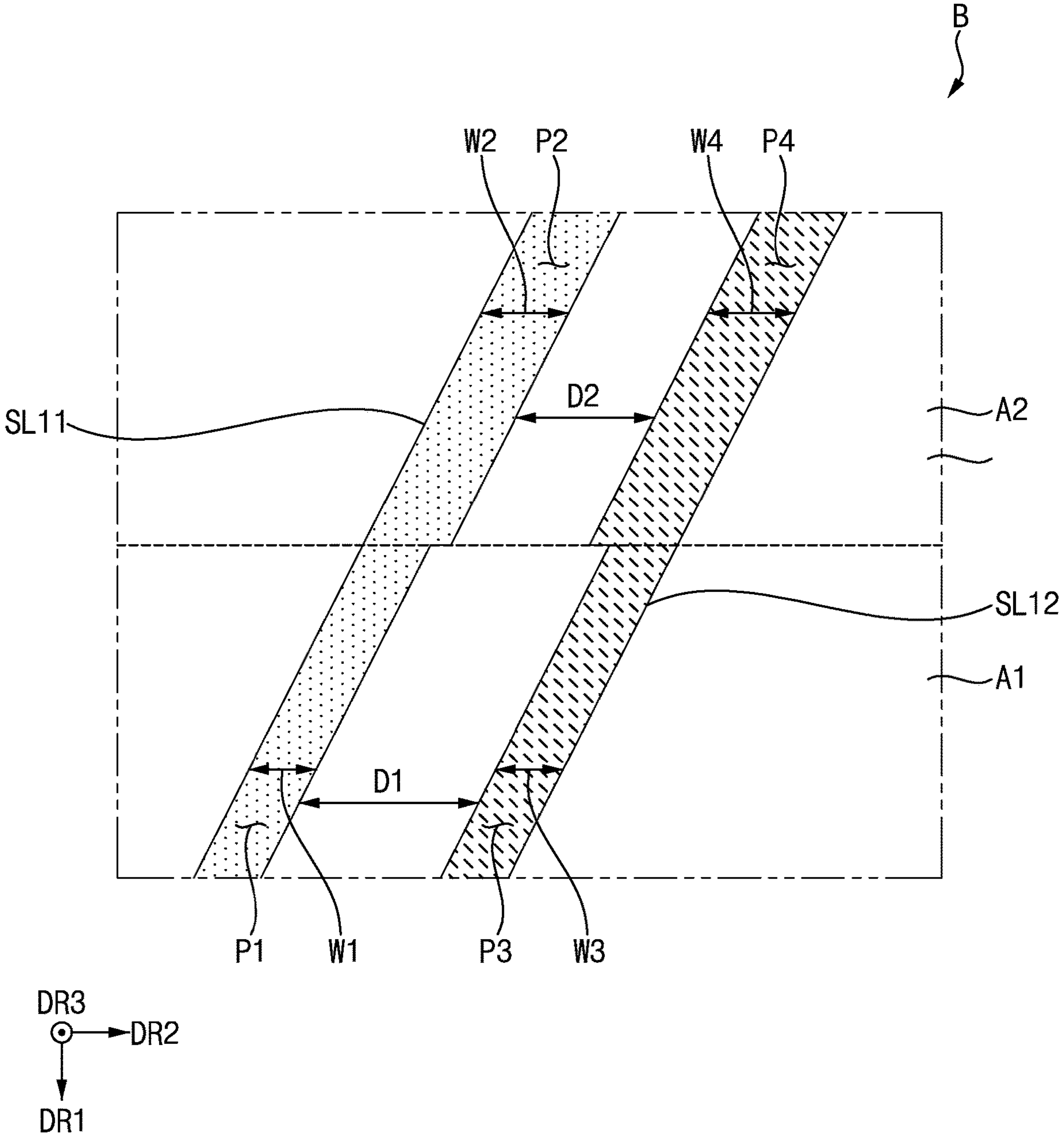
FIG. 4 is an enlarged plan view of area B in FIG. 3 according to an embodiment.
Figure 5:
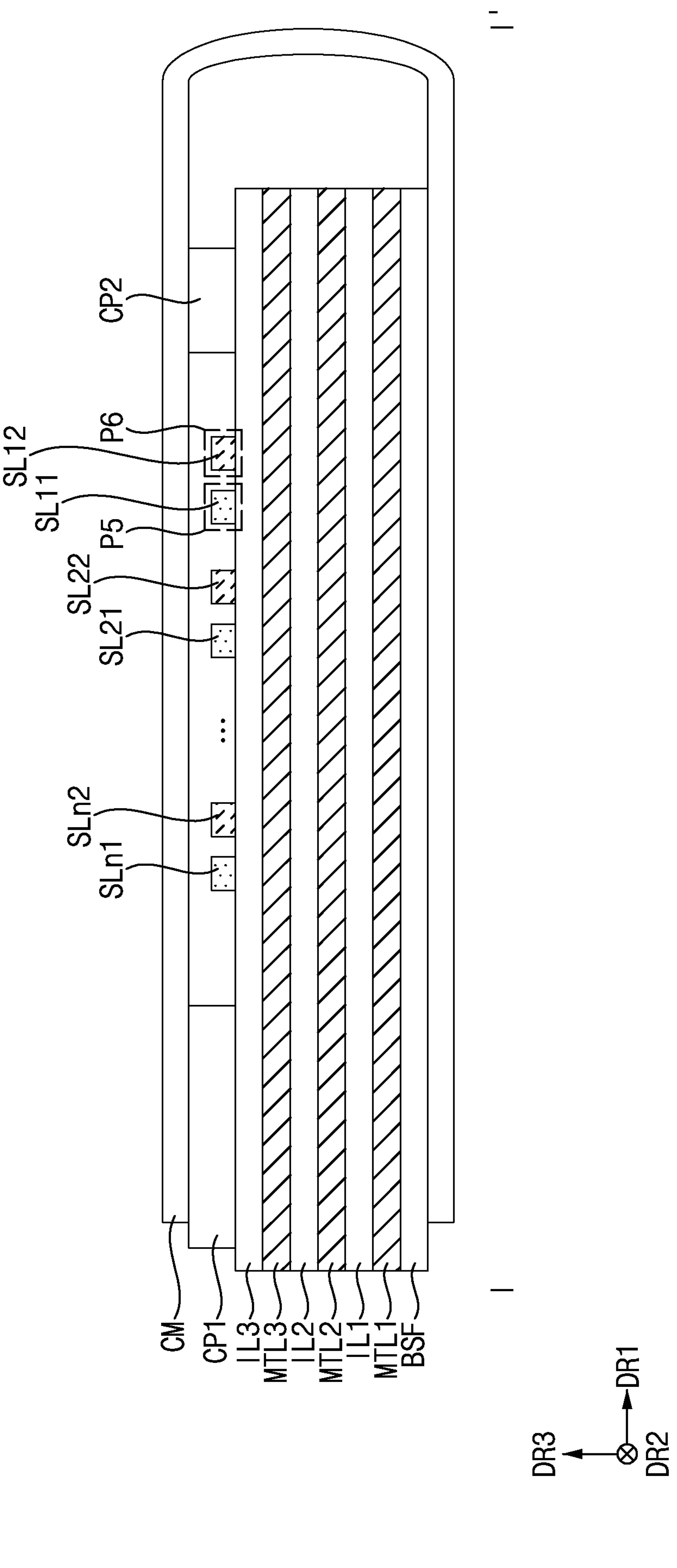
FIG. 5 is a cross-sectional view taken along line I-I' of FIG. 3.

FIG. 3 is an enlarged plan view of area A of FIG. 1 according to an embodiment. FIG. 4 is an enlarged plan view of area B in FIG. 3 according to an embodiment. FIG. 5 is a cross-sectional view taken along line I-I' of FIG. 3. Here, for convenience of descriptions, the connector CNT is omitted in FIGS. 3 and 4.

Referring to FIGS. 1, 3, 4, and 5, the circuit board PCB may include a base film BSF, first to third conductive layers MTL1, MTL2, and MTL3, first to third insulating layers IL1, IL2, and IL3, and unit signal lines SL1, SL2, . . . SLn.

The base film BSF may support components of the circuit board PCB. In an embodiment, the base film BSF may include an insulating material such as an inorganic insulating material and/or an organic insulating material. These insulating material may be used alone or in combination with each other.

As illustrated in FIG. 3, the base film BSF may have a first area A1 and a second area A2. The first area A1 may be an area where at least a portion of the connector CNT is disposed. For example, the first area A1 may be an area that overlaps at least a portion of the connector CNT in a plan view. For example, the first area A1 may be an area corresponding to the connector CNT. The second area A2 may be adjacent to the first area A1. For example, the second area may surround at least a portion of the first area A1. The second area A2 may be an area where the connector CNT is not disposed. For example, the second area A2 may be adjacent to the first area A1, and may be spaced apart from the connector CNT in a plan view.

The first to third conductive layers MTL1, MTL2, and MTL3 and the first to third insulating layers IL1, IL2, and IL3 may be disposed on the base film BSF. For example, the first to third conductive layers MTL1, MTL2, and MTL3 and the first to third insulating layers IL1, IL2, and IL3 may be disposed in both of the first area A1 and the second area A2 of the base film BSF.

In an embodiment, the first conductive layer MTL1 may be disposed on the base film BSF, the first insulating layer IL1 may be disposed on the first conductive layer MTL1, the second conductive layer MTL2 may be disposed on the first insulating layer IL1, the second insulating layer IL2 may be disposed on the second conductive layer MTL2, the third conductive layer MTL3 may be disposed on the second insulating layer IL2, and the third insulating layer IL3 may be disposed on the third conductive layer MTL3.

In an embodiment, each of the first to third conductive layers MTL1, MTL2, and MTL3 may be used as one of a signal layer, a power layer, and a ground layer. For example, when one of the first to third conductive layers MTL1, MTL2, and MTL3 is used as the signal layer, the conductive layer may include a pattern that transmits a signal. In addition, when one of the first to third conductive layers MTL1, MTL2, and MTL3 is used as the power layer, the conductive layer supplies power to various lines and diodes included in the circuit board PCB. In addition, when one of the first to third conductive layers MTL1, MTL2, and MTL3 is used as the ground layer, the conductive layer may be supplied a ground voltage. Meanwhile, the number of conductive layers MTL included in the circuit board PCB and the number of insulating layers IL included in the circuit board PCB are not necessarily limited thereto.

The unit signal lines SL1, SL2, . . . SLn may be disposed on the third insulating layer IL3. In an embodiment, the timing controller TIC may be connected to the unit signal lines SL1, SL2, . . . SLn. Additionally, the connector CNT may be connected to the unit signal lines SL1, SL2, . . . SLn. For example, the external device may be electrically connected to the timing controller TIC through the connector CNT and the unit signal lines SL1, SL2, . . . SLn. Meanwhile, a planar structure (e.g., bending direction) of the unit signal lines SL1, SL2, . . . SLn illustrated in FIG. 3 is only an example, and the present invention is not necessarily limited thereto.

The unit signal lines SL1, SL2, . . . SLn may extend beyond a boundary between the first area A1 and the second area A2 in a plan view. For example, each of the unit signal lines SL1, SL2, . . . SLn may be divided into a part located in the first area A1 and a part located in the second area A2. For example, in a plan view, each of the unit signal lines SL1, SL2, . . . SLn may overlap the connector CNT in the first area A1 and be spaced apart from the connector CNT in the second area A2.

Each of the unit signal lines SL1, SL2, . . . SLn may include a first signal line SL11, SL21, . . . SLn1 and a second signal line SL12, SL22, . . . SLn2. For example, each of the first signal line SL11, SL21, . . . SLn1 and the second signal line SL12, SL22, . . . SLn2 may be divided into a part located in the first area A1 and a part located in the second area A2. In other words, in a plan view, each of the first signal line SL11, SL21, . . . SLn1 and the second signal line SL12, SL22, . . . SLn2 may overlap the connector CNT in the first area A1, or may be spaced apart from the connector CNT in the second area A2.

The first signal line SL11, SL21, . . . SLn1 and the second signal line SL12, SL22, SLn2 may form a differential pair. Accordingly, even if noise changes an alternating current transmitted to the first signal line SL11, SL21, . . . SLn1, the second signal line SL12, SL22, . . . SLn2 may change to compensate for the change of the alternating current transmitted to the first signal line SL11, SL21, . . . SLn1. Conversely, even if noise changes an alternating current transmitted to the second signal line SL12, SL22, . . . SLn2, the first signal line SL11, SL21, . . . SLn1 may change to compensate for the change of the alternating current transmitted to the second signal line SL12, SL22, . . . SLn2. Thus, a quality of signals transmitted through the unit signal lines SL1, SL2, . . . SLn may be increased.

Hereinafter, through FIG. 4, a structure of each of the first signal line SL11, SL21, SLn1 and the second signal line SL12, SL22, . . . SLn2 near the boundary between the first area A1 and the second area A2 will be described in more detail. For convenience, FIG. 4 only illustrates the first signal line SL11 and the second signal line SL12 from the first signal line SL11, SL21, . . . SLn1 and the second signal line SL12, Sl22, . . . SLn2. The other signal lines SL1, SL2, . . . SLn may have a substantially same structure as the first signal line SL11 and the second signal line SL12 illustrated in FIG. 4.

The first signal line SL11, SL21, . . . SLn1 may include a first part P1 located in the first area A1 and a second part P2 located in the second area A2. For example, the first part P1 may refer to a part of the first signal lines SL11, SL21, . . . SLn1 located in the first area A1 near the boundary between the first area A1 and the second area A2, and the second part P2 may refer to a part of the first signal lines SL11, SL21, . . . SLn1 located in the second area A2 near the boundary between the first area A1 and the second area A2. For example, the first part P1 and the second part P2 are merely partitioned by the boundary between the first area A1 and the second area A2 and do not mean a structural disconnection.

In an embodiment, the first part P1 may have a first line width W1, and the second part P2 may have a second line width W2. The second line width W2 may be greater than the first line width W1. In other words, a line width of the first signal line SL11, SL21, . . . SLn1 in the first area A1 may be smaller than a line width of the first signal line SL11, SL21, . . . SLn1 in the second area A2. For example, a line width of the first signal line SL11, SL21, and SLn1 may be modified as it traverses the boundary between the first area A1 and the second area A2.

The second signal line SL12, SL22, . . . SLn2 may include a third part P3 located in the first area A1 and a fourth part P4 located in the second area A2. For example, the third part P1 may refer to a part of the second signal line SL12, SL22, . . . SLn2 located in the first area A1 near the boundary between the first area A1 and the second area A2, and the fourth part P4 may refer to a part of the second signal line SL12, SL22, . . . SLn2 located in the second area A2 near the boundary between the first area A1 and the second area A2. For example, the third part P3 and the fourth part P4 are merely partitioned by the boundary between the first area A1 and the second area A2 and do not mean a structural disconnection.

In an embodiment, the third part P3 may have a third line width W3, and the fourth part P4 may have a fourth line width W4. The fourth line width W4 may be greater than the third line width W3. In other words, a line width of the second signal lines SL12, SL22, . . . SLn2 in the first area A1 may be smaller than a line width of the second signal lines SL12, SL22, . . . SLn2 in the second area A2. For example, a line width of the second signal lines SL12, SL22, . . . SLn2 may be modified as it traverses the boundary between the first area A1 and the second area A2.

In an embodiment, a first separation distance D1 between the first part P1 and the third part P3 may be greater than a second separation distance D2 between the second part P2 and the fourth part P4. In other words, a gap between the first signal line SL11, SL21, . . . SLn1 and the second signal line SL12, SL22, . . . SLn2 in the first area A1 may be greater than a gap between the first signal line SL11, SL21, . . . SLn1 and the second signal line SL12, SL22, . . . SLn2 in the second area A2. For example, a distance between the first signal line SL11, SL21, . . . SLn1 and the second signal line SL12, SL22, . . . SLn2 may be modified as it traverses the boundary between the first area A1 and the second area A2.

Although a case where the first line width W1 of the first part P1 is smaller than the second line width W2 of the second part P2, the third line width W3 of the third part P3 is smaller than the fourth line width W4 of the fourth part P4, and the first separation distance D1 is greater than the second separation distance D2 is illustrated in FIG. 4, the present invention is not necessarily limited thereto.

In some embodiments, the first line width W1 of the first part P1 and the second line width W2 of the second part P2 may be the same, the third line width W3 of the third part P3 and the fourth line width W4 of the fourth part P4 may be the same, and the first separation distance D1 may be greater than the second separation distance D2.

In some embodiments, the first separation distance D1 and the second separation distance D2 may be the same, the first line width W1 of the first part P1 may be smaller than the second line width W2 of the second part P2, and the third line width W3 of the third part P3 may be smaller than the fourth line width W4 of the fourth part P4.

In an embodiment, a first parasitic capacitance between the first signal line SL11, SL21, . . . SLn1 and the second signal line SL12, SL22, . . . SLn2 in the first area A1 may be smaller than a second parasitic capacitance between the first signal line SL11, SL21, . . . SLn1 and the second signal line SL12, SL22, . . . SLn2 in the second area A2.

For example, when the first line width W1 of the first part P1 is smaller than the second line width W2 of the second part P2, and the third line width W3 of the third part P3 is smaller than the fourth line width W4 of the fourth part P4, the first parasitic capacitance between the first signal line SL11, SL21, . . . SLn1 and the second signal line SL12, SL22, . . . SLn2 in the first area A1 may be smaller than a second parasitic capacitance between the first signal line SL11, SL21, . . . SLn1 and the second signal line SL12, SL22, . . . SLn2 in the second area A2 as the first separation distance D1 is greater than the second separation distance D2.

As a result, each of the unit signal lines SL1, SL2, . . . SLn may have different characteristic impedances in the first area A1 and the second area A2. For example, a characteristic impedance of each of the unit signal lines SL1, SL2, . . . SLn may be modified as it traverses the boundary between the first area A1 and the second area A2.

Specifically, a characteristic impedance of the unit signal lines SL1, SL2, . . . SLn may be affected by a parasitic capacitance between the first signal line SL11, SL21, . . . SLn1 and the second signal line SL12, SL22, . . . SLn2. The characteristic impedance may be expressed by a formula $Z_0$=root(L/C) (where $Z_0$ is a characteristic impedance, L is an inductance, and C is a parasitic capacitance).

For example, when the first parasitic capacitance between the first signal line SL11, SL21, . . . SLn1 and the second signal line SL12, SL22, . . . SLn2 in the first area A1 is smaller than the second parasitic capacitance between the first signal line SL11, SL21,~SLn1 and the second signal line SL12, SL22, . . . SLn2 in the second area A2, a first characteristic impedance of each of the unit signal lines SL1, SL2, . . . SLn in the first area A1 may be greater than a second characteristic impedance of each of the unit signal lines SL1, SL2, and SLn in the second area A2.

Since the first area A1 is an area that overlaps at least a portion of the connector CNT in a plan view, a characteristic impedance of each of the unit signal lines SL1, SL2, . . . SLn in the first area A1 may deteriorate after the connector CNT is disposed. For example, by an increase in parasitic capacitance caused by the connector CNT, the characteristic impedance of each of the unit signal lines SL1, SL2, . . . SLn may deteriorate after the connector CNT is disposed. On the other hand, since the second area A2 is an area spaced apart from the connector CNT, a characteristic impedance of each of the unit signal lines SL1, SL2, . . . SLn may be substantially unaffected by the connector CNT.

In an embodiment, the first signal line SL11, SL21,~SLn1 and the second signal line SL12, SL22, . . . SLn2 may have the first structure in which the first line width W1 is smaller than the second line width W2 and the third line width W3 is smaller than the fourth line width W4 and/or the second structure in which the first separation distance D1 is greater than the second separation distance D2. Accordingly, the first characteristic impedance of each of the unit signal lines SL1, SL2, and SLn in the first area A1 may be greater than the second characteristic impedance of each of the unit signal lines SL1, SL2, and SLn in the second area A2.

Accordingly, even when the characteristic impedance in the first area A1 of each of the unit signal lines SL1, SL2, . . . SLn deteriorate by the connector CNT, a characteristic impedance of each of the unit signal lines SL1, SL2, . . . SLn in the first area A1 and a characteristic impedance of each of the unit signal lines SL1, SL2, . . . SLn in the second area A2 may be substantially the same or similar. Therefore, even after the connector CNT is disposed on the circuit board PCB, a signal integrity of each of the unit signal lines SL1, SL2, . . . SLn may be maintained. Accordingly, a transmission performance of high-speed signals through the unit signal lines SL1, SL2, . . . SLn may be increased. Thus, a display quality of the display device DD may be increased.

In an embodiment, as illustrated in FIGS. 3 and 5, the circuit board PCB may further include a first component CP1 and a second component CP2. Each of the first component CP1 and the second component CP2 may receive an electrical signal or voltage supplied from the external device and transmit the electrical signal or voltage to the display panel DP. For example, each of the first component CP1 and the second component CP2 may include elements such as a resistor and a capacitor, a power control module, or the like.

The first component CP1 and the second component CP2 may be disposed on the base film BSF. For example, the first component CP1 and the second component CP2 may be disposed on the third insulating layer IL3. For example, the first component CP1, the second component CP2, and the unit signal lines SL1, SL2, . . . SLn may be disposed at the same level on the base film BSF. In other words, the first component CP1, the second component CP2, the first signal line SL11, SL21, . . . SLn1, and the second signal line SL12, SL22, . . . SLn2 may be located on the same level on the base film BSF.

As illustrated in FIGS. 3 and 5, in a plan view, a fifth part P5 of the first signal line SL11, SL21, . . . SLn1 and a sixth part P6 of the second signal line SL12, SL22, . . . SLn2 may be disposed between the first component CP1 and the second component CP2. In other words, the first component CP1 and the second component CP2 may be spaced apart from each other along the first direction DR1 with the fifth part P5 of the first signal line SL11, SL21, . . . SLn1 and the sixth part P6 of the second signal line SL12, SL22, . . . SLn2 interposed therebetween. For example, in a plan view, the first component CP1 may be located in a direction opposite to the first direction DR1 from the fifth part P5 of the first signal line SL11, SL21, . . . SLn1 and the sixth part P6 of the second signal line SL12, SL22, . . . SLn2, and the second component CP2 may be located in the first direction DR1 from the fifth part P5 of the first signal line SL11, SL21, . . . SLn1 and the sixth part P6 of the second signal line SL12, SL22, . . . SLn2.

In an embodiment, as illustrated in FIG. 5, a height of each of the first component CP1 and the second component CP2 may be greater than a height of each of the first signal line SL11, SL21, . . . SLn1 and the second signal line SL12, SL22, . . . SLn2. In FIG. 5, the height of the first component CP1 and the height of the second component CP2 are illustrated to be the same, but the present invention is not necessarily limited thereto.

The display device DD may further include a cover CM. The cover CM may cover at least a portion of the circuit board PCB. For example, the cover CM may cover the fifth part P5 of the first signal line SL11, SL21, . . . SLn1 and the sixth part P6 of the second signal line SL12, SL22, . . . SLn2. Accordingly, the cover CM may protect the circuit board PCB from external impacts, or the like.

In an embodiment, the cover CM may include a conductive material such as a conductive tape. However, the present invention is not necessarily limited thereto. For example, the cover CM may include an insulating material.

The cover CM may be spaced apart from the first signal line SL11, SL21, . . . SLn1 and the second signal line SL12, SL22, . . . SLn2. For example, the cover CM might not contact the first signal line SL11, SL21, . . . SLn1 and the second signal line SL12, SL22, . . . SLn2. Specifically, the cover CM may be spaced apart from the fifth part P5 of the first signal line SL11, SL21, SLn1 and the sixth part P6 of the second signal line SL12, SL22, . . . SLn2.

For example, since the circuit board PCB includes the first component CP1 and the second component CP2 spaced apart from each other along the first direction DR1 with the fifth part P5 of the first signal line SL11, SL21, . . . SLn1 and the sixth part P6 of the second signal line SL12, SL22, . . . SLn2 interposed therebetween while height of each of the first component CP1 and the second component CP2 being greater than the height of each of the first signal line SL11, SL21,~SLn1 and the second signal line SL12, SL22, . . . SLn2, the cover CM might not contact the first signal line SL11, SL21, to SLn1 and the second signal line SL12, SL22, . . . SLn2 by the first component CP1 and the second component CP2.

Accordingly, deterioration of a signal integrity of each of the unit signal lines SL1, SL2, to SLn by contact with the cover CM may be prevented or reduced. For example, when the cover CM contacts the unit signal lines SL1, SL2, and SLn, an intensity of contact with each of the unit signal lines SL1, SL2, and SLn may be distributed. Accordingly, a signal integrity of the unit signal lines SL1, SL2, to SLn may deteriorate. However, according to embodiments, since the cover CM is spaced apart from the unit signal lines SL1, SL2, . . . SLn by the first component CP1 and the second component CP2, deterioration of a signal integrity of each of the unit signal lines SL1, SL2, to SLn by contact with the cover CM may be prevented or reduced. Accordingly, a transmission performance of high-speed signals through the unit signal lines SL1, SL2, and SLn may be increased. Accordingly, a display quality of the display device DD can be increased.

Figure 6:
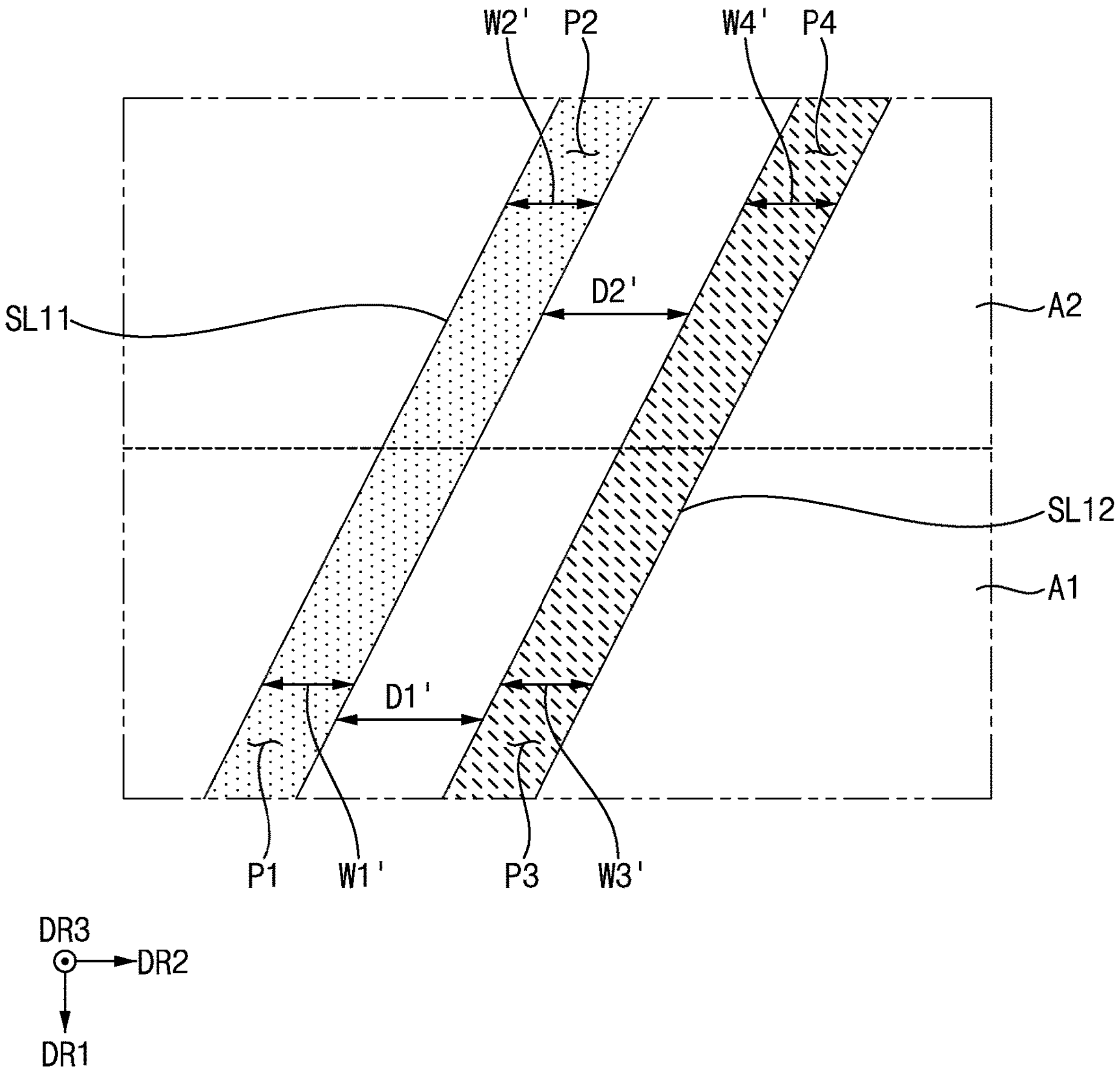
FIG. 6 is an enlarged plan view of area B in FIG. 3 according to an embodiment.

FIG. 6 is an enlarged plan view of area B in FIG. 3 according to an embodiment.

Referring to FIG. 6, in an embodiment, the first part P1 may have a first line width W1', and the second part P2 may have a second line width W2'. The first line width W1' and the second line width W2' may be substantially the same'. In other words, a line width of the first signal line SL11, SL21, . . . SLn1 might not substantially change as it traverses the boundary between the first area A1 and the second area A2.

Additionally, the third part P3 may have a third line width W3', and the fourth part P4 may have a fourth line width W4'. The third line width W3' and the fourth line width W4' may be substantially the same. In other words, a line width of the second signal line SL12, SL22, SLn2 might not substantially change as it traverses the boundary between the first area A1 and the second area A2.

In addition, a first separation distance D1' between the first part P1 and the second part P2 may be substantially the same as a second separation distance D2' between the third part P3 and the fourth part P4. In other words, a gap between the first signal line SL11, SL21, . . . SLn1 and the second signal line SL12, SL22, . . . SLn2 might not substantially change as it traverses the boundary between the first area A1 and the second area A2.

For example, when the circuit board PCB includes the first component CP1 and the second component CP2 described with reference to FIGS. 3 and 5, the line width of the first signal line SL11, SL21, . . . SLn2, the line width of the second signal line SL12, SL22, . . . SLn2, and the gap between the first signal line SL11, SL21, . . . SLn1 and the second signal line SL12, SL22, . . . SLn2 might not substantially change as they transverse the boundary between the first area A1 and the second area A2.

Figure 7:
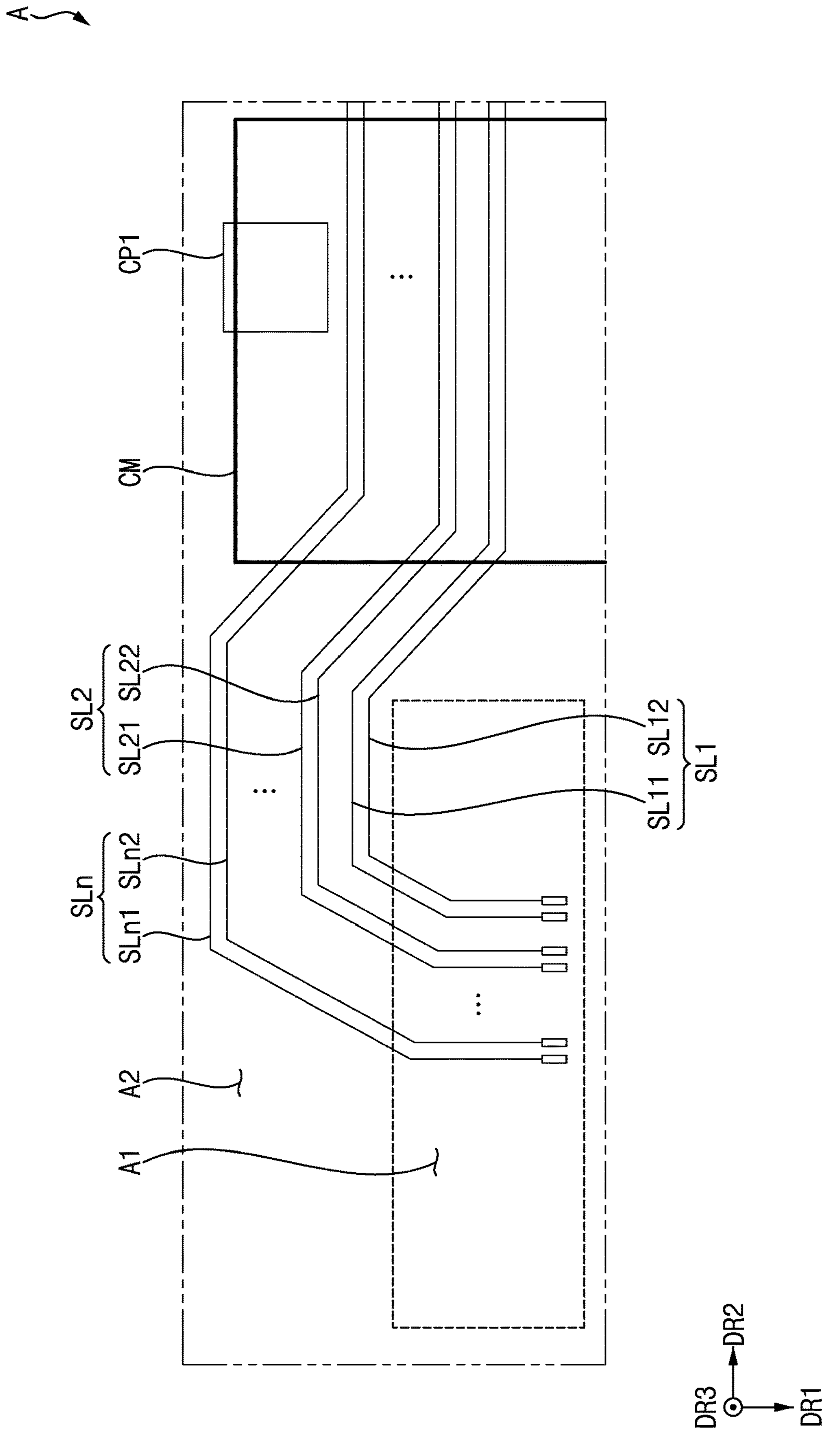
FIG. 7 is an enlarged plan view of area A of FIG. 1 according to an embodiment.

FIG. 7 is an enlarged plan view of area A of FIG. 1 according to an embodiment.

Referring to FIG. 7, in an embodiment, the second component CP2 may be omitted. In this case, the first signal line SL11, SL21, . . . SLn2 and the second signal line SL12, SL22, . . . SLn2 may have a planar structure described with reference to FIG. 4. For example, when the first signal line SL11, SL21, . . . SLn1 and the second signal line SL12, SL22, . . . SLn2 have the first structure in which the first line width W1 is smaller than the second line width W2 and the third line width W3 is smaller than the fourth line width W4 and/or the second structure in which the first separation distance D1 is greater than the second separation distance D2, the second component CP2 may be omitted.

In summary, according to embodiments, the display device DD may have the first structure in which a line width of the first signal line SL11, SL21, . . . SLn2 and a line width of the second signal line SL12, SL22, . . . SLn2 change as it transverse the boundary of the first area A1 and the second area A2, the second structure in which a gap between the first signal line SL11, SL21, . . . SLn2 and the second signal line SL12, SL22, . . . SLn2 changes as it transverse the boundary of the first area A1 and the second A2, and/or a third structure in which the second component CP2 is disposed below the unit signal lines SL1, SL2, . . . SLn.

Accordingly, deterioration of a signal integrity of each of the unit signal lines SL1, SL2, to SLn may be prevented or reduced. Accordingly, a transmission performance of high-speed signals through the unit signal lines SL1, SL2, and SLn may be increased. Accordingly, a display quality of the display device DD may be increased.

Figure 8:
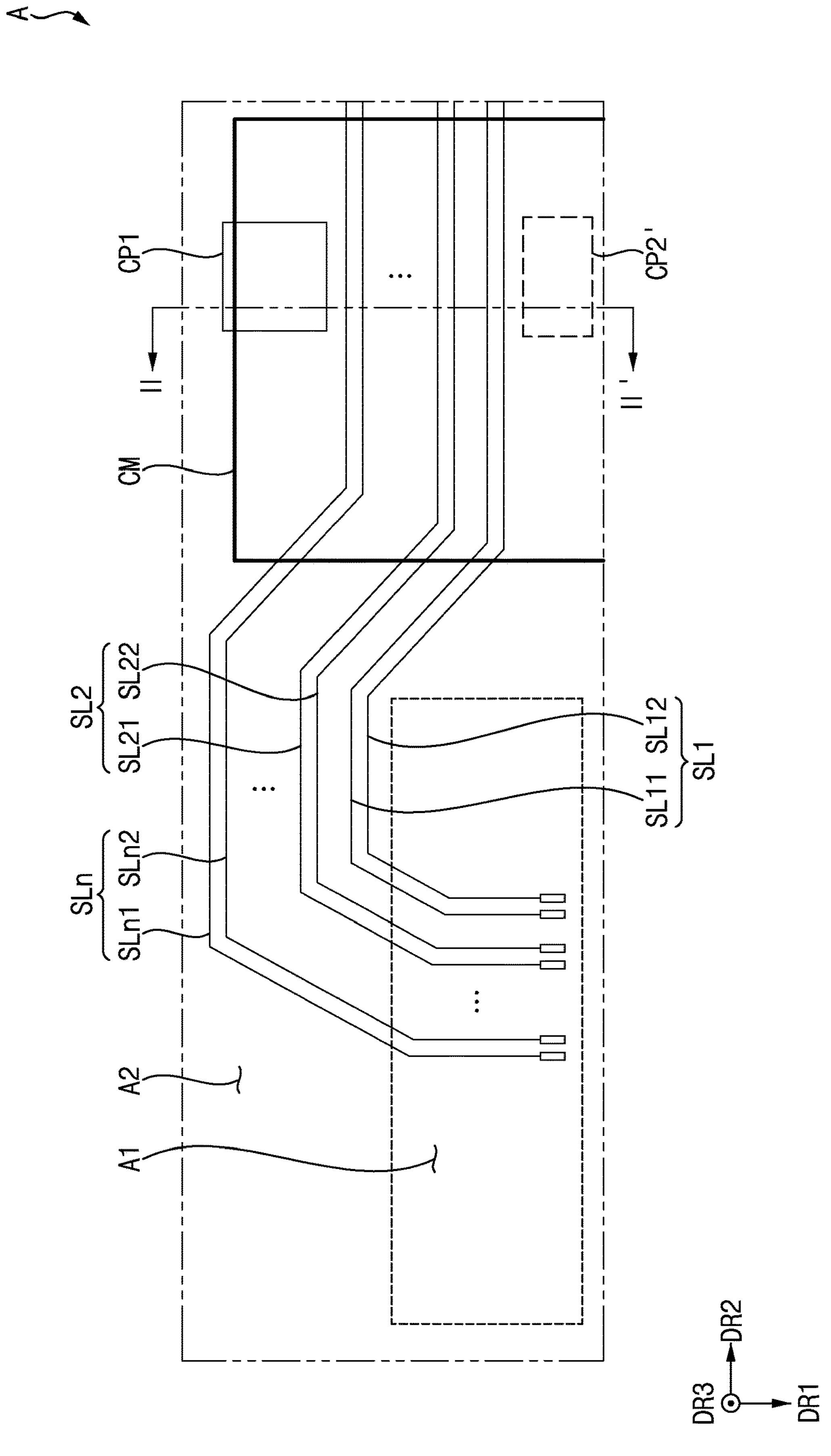
FIG. 8 is an enlarged plan view of area A of FIG. 1 according to an embodiment.
Figure 9:
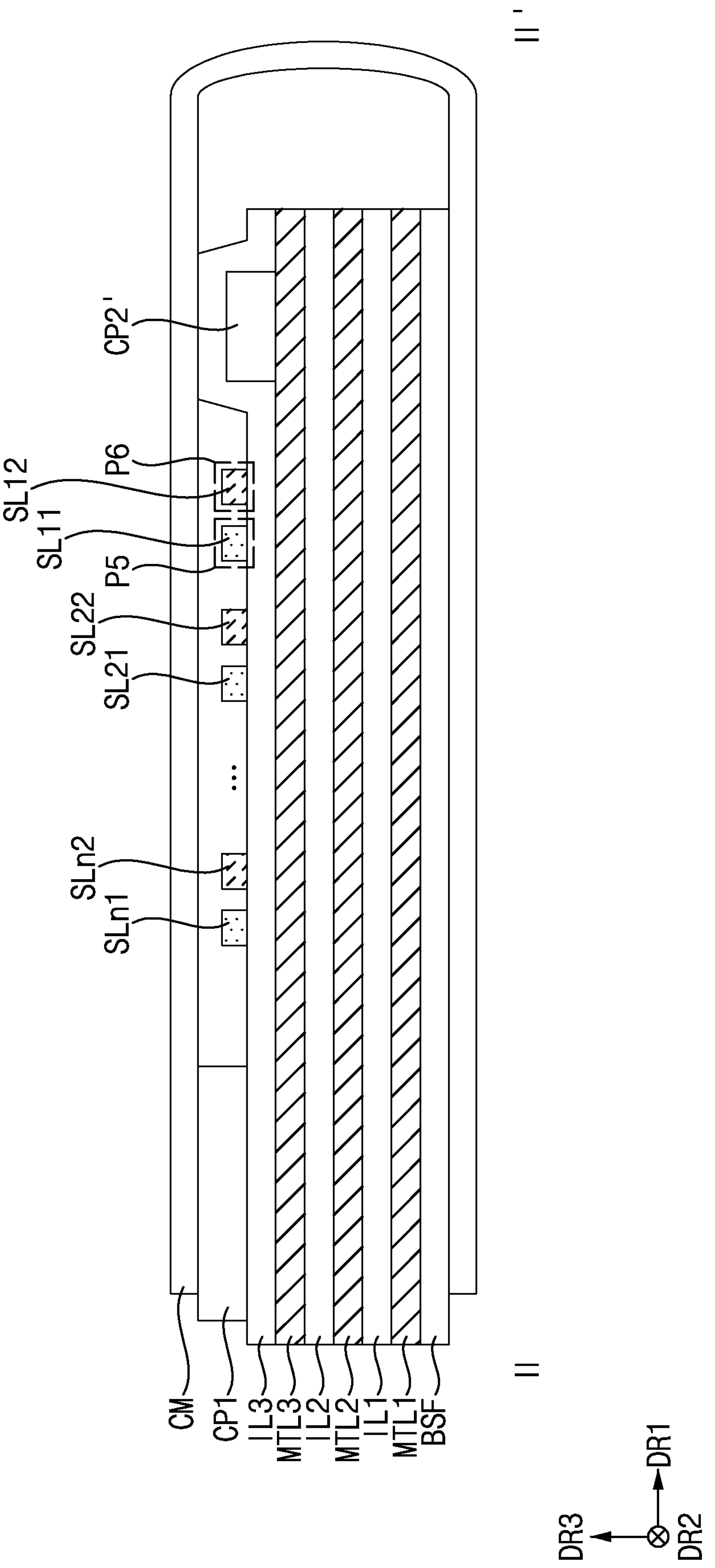
FIG. 9 is a cross-sectional view taken along line II-II' of FIG. 8.

FIG. 8 is an enlarged plan view of area A of FIG. 1 according to an embodiment. FIG. 9 is a cross-sectional view taken along line II-II' of FIG. 8.

The display device DD described with reference to FIGS. 8 and 9 may be substantially same as or similar to the display device DD described with reference to FIGS. 3 and 5 except for including a second component CP2' instead of the second component CP2. Therefore, to the extent that details are not described, it may be assumed that the elements are at least similar to corresponding elements described elsewhere in the specification.

Referring to FIGS. 8 and 9, in an embodiment, the circuit board PCB may include the second component CP2'. The second component CP2' may include elements such as resistors and capacitors. The second component CP2' may be a dummy element that does not substantially affect electrical characteristics of the circuit board PCB. For example, the second component CP2' may be a zero-ohm resistor.

In a plan view, the first component CP1 and the second component CP2' may be spaced apart from each other along the first direction DR1 with the fifth part P5 of the first signal line SL11, SL21, . . . SLn1 and the sixth part P6 of the second signal line SL12, SL22, . . . SLn2 interposed therebetween. For example, in a plan view, the first component CP1 may be located in a direction opposite to the first direction DR1 from the fifth part P5 of the first signal line SL11, SL21, . . . SLn1 and the sixth part P6 of the second signal line SL12, SL22, . . . SLn2, and the second component CP2' may be located in the first direction DR1 from the fifth part P5 of the first signal line SL11, SL21, . . . SLn1 and the sixth part P6 of the second signal line SL12, SL22, . . . SLn2.

The second component CP2' may be disposed on at least one of the first to third conductive layers MTL1, MTL2, and MTL3. Specifically, the second component CP2' may be disposed on at least one of the first to third conductive layers MTL1, MTL2, and MTL3 and contact with at least one of the first to third conductive layers MTL1, MTL2, and MTL3. Additionally, the second component CP2' may be disposed below the first signal line SL11, SL21, . . . SLn1 and the second signal line SL12, SL22, . . . SLn2. For example, the second component CP2' may be disposed at a lower level than the first signal line SL11, SL21, . . . SLn1 and the second signal line SL12, SL22, . . . SLn2 on the base film BSF.

For example, the second component CP2' may be disposed on a layer used as the ground layer among the first to third conductive layers MTL1, MTL2, and MTL3 and directly contact the ground layer. However, the present invention is not necessarily limited thereto. For example, the second component CP2' may be disposed to directly contact a layer used as the power layer among the first to third conductive layers MTL1, MTL2, and MTL3, and directly contact a layer used as the signal layer among the first to third conductive layers MTL1, MTL2, and MTL3.

Since the second component CP2' is disposed on at least one of the first to third conductive layers MTL1, MTL2, and MTL3 and contact at least one of the first to third conductive layers MTL1, MTL2, and MTL3, an upper surface of at least one insulating layer disposed on the second component CP2' and below the unit signal lines SL1, SL2, to SLn may have a step.

For example, the second component CP2' may be disposed on the third conductive layer MTL3 so as to contact the third conductive layer MTL3. In this case, the second component CP2' may be covered by the third insulating layer IL3, and an upper surface of the third insulating layer IL3 may have a step adjacent to the second component CP2'. Specifically, a portion of the upper surface of the third insulating layer IL3 may have a height greater than the height of each of the first signal line SL11, SL21, . . . SLn1 and the second signal line SL12, SL22, . . . SLn2 by the second component CP2.

The surface height of the first component CP1 may be greater than the surface height of each of the first signal line SL11, SL21, . . . SLn1, and the second signal line SL12, SL22, . . . SLn2. For example, a portion of the third insulating layer IL3 where the step is formed may contact the cover CM.

According to embodiments, the circuit board PCB may include the first component CP1 and the second component CP2' spaced apart from each other along the first direction DR1 with the fifth part P5 of the first signal line SL11, SL21, . . . SLn1 and the sixth part P6 of the second signal line SL12, SL22, . . . SLn2 interposed therebetween. The portion of the upper surface of the third insulating layer IL3 may have the height greater than the height of each of the first signal line SL11, SL21, . . . SLn1 and the second signal line SL12, SL22, . . . SLn2 by the second component CP2'. Accordingly, the cover CM might not contact the first signal line SL11, SL21, . . . SLn1 and the second signal line SL12, SL22, . . . SLn2. Accordingly, deterioration of a signal integrity of each of the unit signal lines SL1, SL2, . . . SLn by contact with the cover CM may be prevented or reduced. Accordingly, a transmission performance of high-speed signals through the unit signal lines SL1, SL2, and SLn may be increased. Accordingly, a display quality of the display device DD may be increased.

Meanwhile, in the display device DD according to embodiments described with reference to FIGS. 8 and 9, the first signal line SL11, SL21, . . . SLn2 and the second signal line SL12, SL22, . . . SLn2 may have the planar structure described with reference to FIG. 4 or the planar structure described with reference to FIG. 6. To the extent that details are not described, it may be assumed that the elements are at least similar to corresponding elements described in reference to FIGS. 4 and 6.

Figure 10:
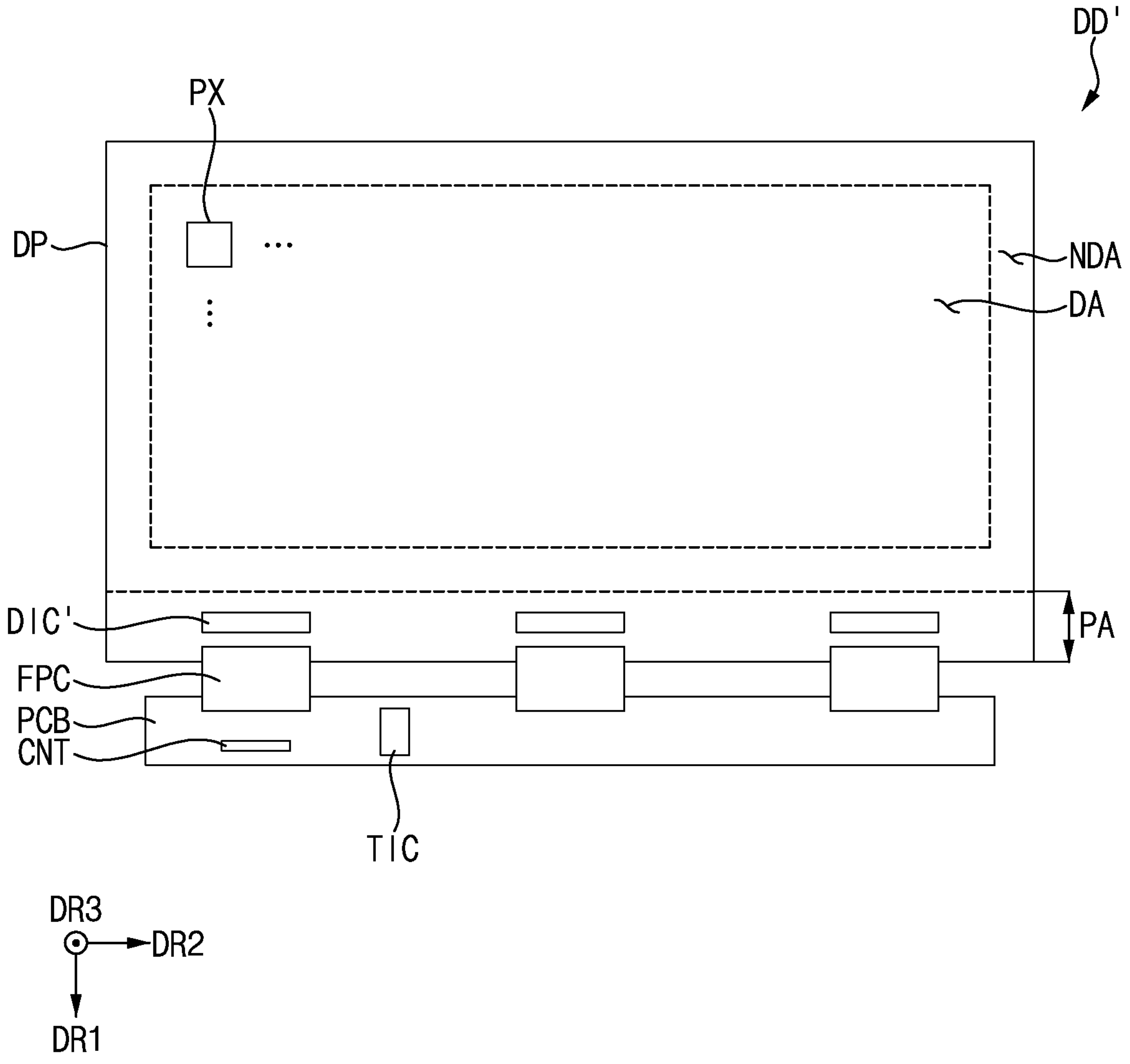
FIG. 10 is a plan view illustrating a display device according to an embodiment.

FIG. 10 is a plan view illustrating a display device according to an embodiment.

The display device DD' described with reference to FIG. 10 may be substantially the same as the display device DD described with reference to FIGS. 1 to 9 except for a position of a data driver DIC'. Therefore, to the extent that details are not described, it may be assumed that the elements are at least similar to corresponding elements described elsewhere in the specification.

Referring to FIG. 10, in the display device DD' according to an embodiment, the data driver DIC' may be disposed on the display panel DP. For example, the data driver DIC' may be disposed in the pad area PA of the display panel DP. For example, the display device DD' may have a chip on glass (COG) structure or a chip on plastic (COP) structure.

Figure 11:
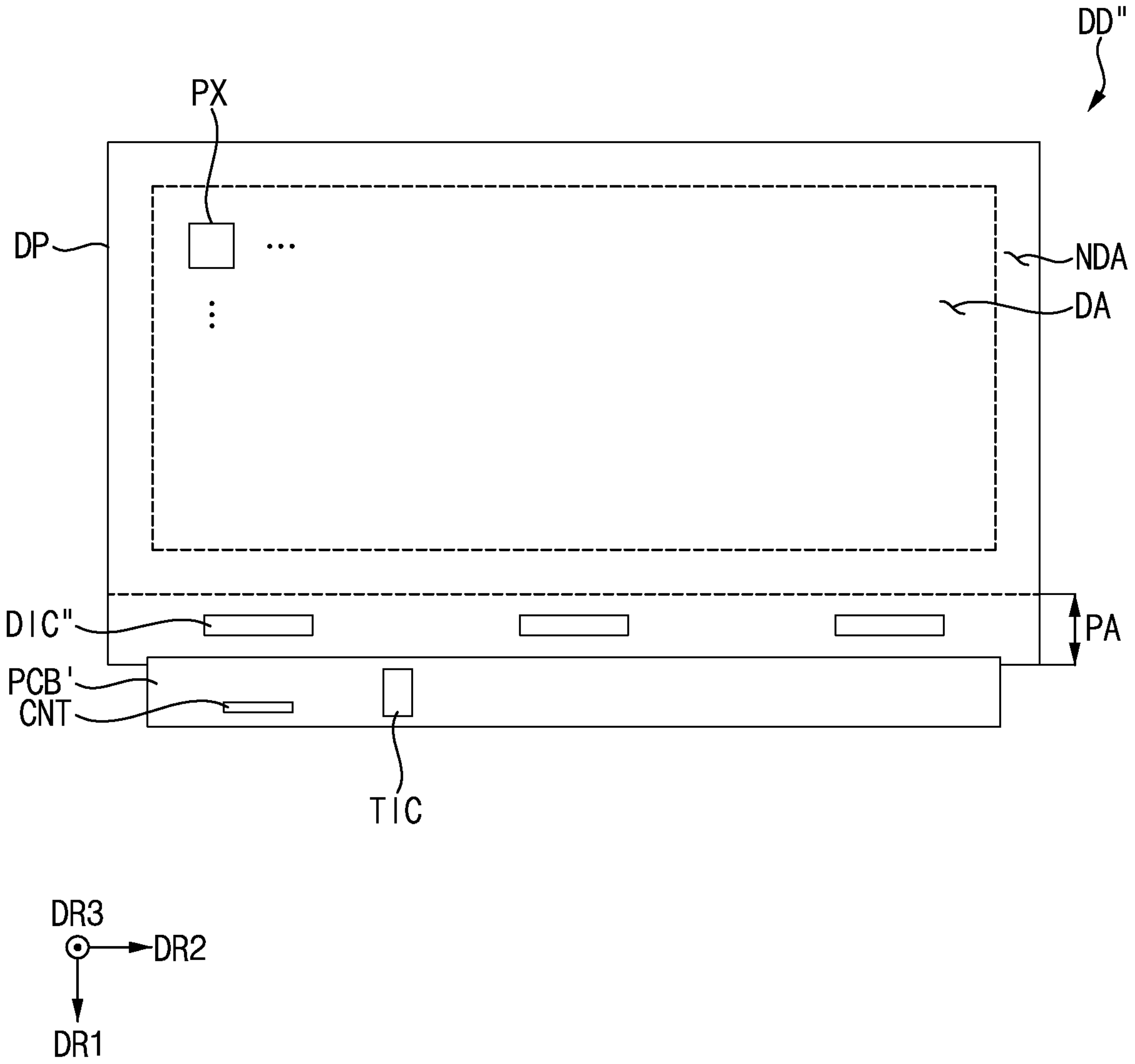
FIG. 11 is a plan view illustrating a display device according to an embodiment.

FIG. 11 is a plan view illustrating a display device according to an embodiment.

The display device DD" described with reference to FIG. 11 may be substantially the same as the display device DD described with reference to FIGS. 1 to 9 except for a position of a data driver DIC" and a position of a circuit board PCB'. Therefore, to the extent that details are not described, it may be assumed that the elements are at least similar to corresponding elements described elsewhere in the specification.

Referring to FIG. 11, in the display device DD" according to an embodiment of, the data driver DIC" may be disposed on the display panel DP. For example, the data driver DIC" may be disposed in the pad area PA of the display panel DP. For example, the display device DD" may have a chip on glass (COG) structure or a chip on plastic (COP) structure.

In the display device DD" according to an embodiment, the flexible circuit films FPC, (See FIG. 1) may be omitted. For example, the circuit board PCB' may be directly connected to the display panel DP. The circuit board PCB' may be disposed on one side of the display panel DP. Specifically, the circuit board PCB' may overlap a portion of the pad area PA. The circuit board PCB' may be electrically connected to the pad electrodes disposed in the pad area PA. Accordingly, a dead space of the display device DD" may be reduced. Additionally, a manufacturing process for the display device DD" may be simplified and a manufacturing cost of the display device DD" may be reduced.

Meanwhile, the circuit board PCB' described with reference to FIG. 11 may be substantially the same as the circuit board PCB described with reference to FIGS. 1 to 9 except for an arrangement position, and therefore to the extent that details are not described, it may be assumed that the elements are at least similar to corresponding elements described.

The invention should not be construed as being necessarily limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention.

What is claimed is:

1. A display device comprising:

a display panel including pixels; and a circuit board electrically connected to the display panel, wherein the circuit board includes:

a base film having a first area overlapping at least a portion of a connector and a second area spaced apart from the connector; and a unit signal line disposed on the base film, electrically connected to the connector, and having a first characteristic impedance in the first area and a second characteristic impedance in the second area, the second characteristic impedance being smaller than the first characteristic impedance.

2. The display device of claim 1, wherein the unit signal line includes:

a first signal line extending beyond a boundary between the first area and the second area on the base film, wherein the first signal line includes a first part disposed in the first area and a second part disposed in the second area; and a second signal line extending beyond a boundary between the first area and the second area on the base film, wherein the second signal line includes a third part disposed in the first area and a fourth part disposed in the second area.

3. The display device of claim 2, wherein the first signal line and the second signal line form a differential pair.

4. The display device of claim 2, wherein a first line width of the first part of the first signal line is smaller than a second line width of the second part of the first signal line, wherein a third line width of the third part of the second signal line is smaller than a fourth line width of the fourth part of the second signal line.

5. The display device of claim 2, wherein a first separation distance between the first part of the first signal line and the third part of the second signal line is greater than a second separation distance between the second part of the first signal line and the fourth part of the second signal line.

6. The display device of claim 2, wherein a first parasitic capacitance between the first signal line and the second signal line in the first area is smaller than a second parasitic capacitance between the first signal line and the second signal line in the second area.

7. The display device of claim 2, wherein the circuit board further includes a first component and a second component disposed on the base film and spaced apart from each other along a first direction, wherein a fifth part of the first signal line and a sixth part of the second signal line are disposed between the first component and the second component.

8. The display device of claim 7, further comprising:

a cover covering the fifth part of the first signal line and the sixth part of the second signal line, wherein the cover is spaced apart from the fifth part of the first signal line and the sixth part of the second signal line.

9. The display device of claim 8, wherein the cover is a conductive tape.

10. The display device of claim 7, wherein the first component, the second component, the first signal line, and the second signal line are disposed at a same level on the base film.

11. The display device of claim 10, wherein a height of each of the first component and the second component is greater than a height of each of the first signal line and the second signal line.

12. The display device of claim 7, wherein the circuit board further includes at least one conductive layer disposed on the base film and below the first signal line and the second signal line, wherein the first component, the first signal line, and the second signal line are disposed at a same level on the base film, wherein the second component is disposed on the conductive layer to directly contact the conductive layer and below the first signal line and the second signal line.

13. The display device of claim 12, wherein the circuit board further includes an insulating layer disposed on the conductive layer and the second component and below the first signal line and the second signal line, wherein a portion of an upper surface of the insulating layer with a height greater than a height of each of the first signal line and the second signal line adjacent to the second component.

14. A display device comprising:

a display panel including pixels; and a circuit board electrically connected to the display panel, wherein the circuit board includes:

a base film having a first area overlapping at least a portion of a connector and a second area spaced apart from the connector;

a first component and a second component disposed on the base film and spaced apart from each other along a first direction;

a first signal line disposed on the base film, extending in a second direction intersecting the first direction, wherein the first signal line includes a first portion of the first signal line disposed between the first component and the second component; and a second signal line disposed on the base film, extending in the second direction, wherein the second signal line includes a second portion of the second signal line disposed between the first component and the second component, wherein the first signal line and the second signal line form a differential pair, and wherein the differential pair has a first characteristic impedance in the first area and a second characteristic impedance in the second area, which is different from the first characteristic impedance.

15. The display device of claim 14, further comprising:

a cover covering the first portion of the first signal line and the second portion of the second signal line, wherein the cover is spaced apart from the first portion of the first signal line and the second portion of the second signal line.

16. The display device of claim 15, wherein the cover is a conductive tape.

17. The display device of claim 14, wherein the first component, the second component, the first signal line, and the second signal line are disposed at the same level on the base film, wherein a height of each of the first component and the second component is greater than a height of each of the first signal line and the second signal line.

18. The display device of claim 14, wherein the circuit board further includes at least one conductive layer disposed on the base film and below the first signal line and the second signal line, wherein the first component, the first signal line, and the second signal line are disposed at the same level on the base film, and wherein the second component is disposed on the conductive layer to directly contact the conductive layer, and below the first signal line and the second signal line.

19. The display device of claim 18, wherein the circuit board further includes an insulating layer disposed on the conductive layer and the second component and below the first signal line and the second signal line, wherein a portion of an upper surface of the insulating layer with a height greater than a height of each of the first signal line and the second signal line adjacent to the second component.

* * * * *